United States Patent
Saito et al.

(10) Patent No.: US 9,469,801 B2
(45) Date of Patent: Oct. 18, 2016

(54) WORKING FLUID COMPOSITION FOR REFRIGERATOR, REFRIGERATION OIL, AND METHOD FOR PRODUCING SAME

(71) Applicant: JX NIPPON OIL & ENERGY CORPORATION, Tokyo (JP)

(72) Inventors: Masanori Saito, Tokyo (JP); Takeshi Okido, Tokyo (JP); Ken Sawada, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/381,829

(22) PCT Filed: Feb. 28, 2013

(86) PCT No.: PCT/JP2013/055385
§ 371 (c)(1),
(2) Date: Aug. 28, 2014

(87) PCT Pub. No.: WO2013/129566
PCT Pub. Date: Sep. 6, 2013

(65) Prior Publication Data
US 2015/0014575 A1    Jan. 15, 2015

(30) Foreign Application Priority Data
Mar. 2, 2012   (JP) ................................. 2012-046996

(51) Int. Cl.
*C09K 5/04*  (2006.01)
*C10M 171/00* (2006.01)

(52) U.S. Cl.
CPC .......... *C09K 5/042* (2013.01); *C10M 171/008* (2013.01); *C09K 2205/11* (2013.01); *C09K 2205/12* (2013.01); *C10M 2203/1006* (2013.01); *C10M 2207/026* (2013.01); *C10M 2207/042* (2013.01); *C10M 2207/2835* (2013.01); *C10M 2207/301* (2013.01); *C10M 2209/1055* (2013.01); *C10M 2215/064* (2013.01); *C10M 2215/086* (2013.01); *C10M 2223/041* (2013.01); *C10N 2220/023* (2013.01); *C10N 2220/303* (2013.01); *C10N 2230/02* (2013.01); *C10N 2230/06* (2013.01); *C10N 2230/08* (2013.01); *C10N 2230/10* (2013.01); *C10N 2230/70* (2013.01); *C10N 2240/30* (2013.01)

(58) Field of Classification Search
CPC ............ C09K 5/042; C10M 171/008; C10M 2207/30; C10M 2209/111
See application file for complete search history.

(56) References Cited

U.S. PATENT DOCUMENTS

| | | | | |
|---|---|---|---|---|
| 5,922,658 | A * | 7/1999 | Duncan | C10L 1/143 44/398 |
| 6,582,621 | B1 * | 6/2003 | Sasaki | C09K 5/045 252/67 |
| 8,419,968 | B2 | 4/2013 | Carr et al. | |
| 2010/0117022 | A1 | 5/2010 | Carr et al. | |
| 2011/0079749 | A1 * | 4/2011 | Carr | C10M 105/42 252/68 |

FOREIGN PATENT DOCUMENTS

| | | |
|---|---|---|
| CN | 1315492 | 10/2001 |
| CN | 102216438 | 10/2011 |
| JP | 2002-220595 | * 8/2002 |
| JP | 2003-020493 | 1/2003 |
| JP | 2003-041278 | 2/2003 |
| JP | 2007-232353 | 9/2007 |
| JP | 2008-248002 | 10/2008 |
| JP | 2009-079142 | 4/2009 |
| JP | 2009-221375 | * 10/2009 |
| JP | 2011-184536 | 9/2011 |
| WO | 98/58042 | 12/1998 |

OTHER PUBLICATIONS

International Search Report of PCT/JP2013/055385 mailed May 14, 2013.
International Preliminary Report on Patentability of PCT/JP2013/055385 mailed Sep. 12, 2014.
Chinese Office Action for Application No. 201380012094.8, mailed May 14, 2015.
European Search Report issued with respect to Application No. 13754320.3, mail date is Nov. 9, 2015.

* cited by examiner

Primary Examiner — John Hardee
(74) Attorney, Agent, or Firm — Greenblum & Bernstein, P.L.C.

(57) ABSTRACT

A working fluid composition for a refrigerating machine of the present invention comprises: a refrigerating machine oil comprising a complex ester as a base oil; and a hydrocarbon refrigerant having 2 to 4 carbon atoms, the complex ester being obtainable by further esterifying, with at least one selected from a monohydric alcohol having 1 to 20 carbon atoms and a fatty acid having 2 to 20 carbon atoms, an ester intermediate obtained by reacting a neopentyl polyol with a dibasic acid, and having an acid value of 0.5 mgKOH/g or less, the refrigerating machine oil having a kinematic viscosity at 100° C. of 2 to 50 mm$^2$/s.

8 Claims, No Drawings

WORKING FLUID COMPOSITION FOR REFRIGERATOR, REFRIGERATION OIL, AND METHOD FOR PRODUCING SAME

TECHNICAL FIELD

The present invention relates to a working fluid composition for a refrigerating machine using, as a refrigerant, a hydrocarbon having an extremely low global warming potential, such as ethane, propane, n-butane or isobutane; a refrigerating machine oil (i.e., a lubricating oil for a refrigerating machine) to be used together with the hydrocarbon refrigerant; and a method for manufacturing the same.

BACKGROUND ART

In conventional refrigerating machines, air conditioners, cold storage chambers and the like, freon containing fluorine and chlorine was used as a refrigerant. Examples of the freon include chlorofluorocarbon (CFC) such as R-11 (trichloromonofluoromethane) or R-12 (dichlorodifluoromethane), and hydrochlorofluorocarbon (HCFC) such as R-22 (monochlorodifluoromethane).

However, the production and use of the freon have been internationally regulated due to a recent problem of ozone layer depletion, and a novel hydrogen-containing freon refrigerant not containing chlorine is started to be used instead of the conventional freon nowadays. Examples of the hydrogen-containing freon refrigerant include tetrafluoroethane (R-134 or R-134a) and a mixed refrigerant of hydrofluorocarbon (HFC) such as R410A or R407C.

Although the HFC does not deplete the ozone layer, however, it has a high greenhouse effect, and hence is not necessarily an excellent refrigerant from the viewpoint of global warming that has become a recent problem.

Therefore, a lower hydrocarbon having 2 to 4 carbon atoms has been recently gathering attention because it does not deplete the ozone layer and causes an extremely small influence on the global warming as compared with the aforementioned chlorine or non-chlorine fluorocarbon refrigerants, and it is now being examined to be used, as a refrigerant, in a refrigeration system having high cooling efficiency such as a room air conditioner or an industrial refrigerating machine including a compressor, a condenser, a throttle device, an evaporator and the like, which has been developed with the freon refrigerant. Such a hydrocarbon refrigerant has a global warming potential of $1/100$ or less and is highly efficient as compared with R401A that is a mixed refrigerant of hydrofluorocarbon (HFC) currently widely used as a refrigerant for a room air conditioner. In particular, there is a possibility that use of propane having 3 carbon atoms (R290) can largely and economically reduce the influence on the global warming without requiring large-scaled design change of an air conditioner. However, this propane is combustible, and therefore, there are a problem of technical development for using it safely, and a problem of selection, as a lubricant, of a refrigerating machine oil having appropriate compatibility with this refrigerant.

As a lubricating oil for the lower hydrocarbon refrigerant, a mineral oil of, for example, naphthene- or paraffin-based mineral oil, an alkylbenzene oil, an ester oil, an ether oil and a fluorinated oil having compatibility with the refrigerant have been proposed. Besides, a polyol ester (POE) has been proposed as the ester oil (see Patent Literature 1).

CITATION LIST

Patent Literature

Patent Literature 1: Japanese Patent Application Laid-Open No. 2003-41278

SUMMARY OF INVENTION

Technical Problem

However, the hydrocarbon refrigerant has a small polarity, and hence is excessively dissolved in the conventional refrigerating machine oil such as the mineral oil, alkylbenzene or polyol ester. Therefore, the viscosity of the lubricating oil after dissolving the refrigerant therein (namely, the viscosity of the mixture of the refrigerant and the refrigerating machine oil) is lowered, and it is difficult to retain proper viscosity in a sliding portion of a refrigerating compressor, causing friction.

Besides, if the mineral oil, the alkylbenzene oil or the like is used as a hydrocarbon refrigerating machine oil, lubricity cannot be retained, because the viscosity of the lubricating oil after dissolving the refrigerant therein is lowered, and in addition, it is necessary to increase the filling amount of the refrigerant for attaining given cooling capacity. Here, because the lower hydrocarbon such as propane used as the refrigerant is combustible, it is required to minimize the filling amount thereof, and therefore, it is not preferable to increase the filling amount of the refrigerant.

Furthermore, the solubility of the hydrocarbon refrigerant in the ester oil such as the polyol ester is high although it is not as high as that in the hydrocarbon oil. Besides, although it is necessary to increase the viscosity by increasing the molecular weight of the refrigerating machine oil itself as a countermeasure against the viscosity lowering, it is difficult for the ester oil such as the polyol ester to increase the viscosity while retaining a low pour point, which is an indispensable characteristic as the refrigerating machine oil.

On the other hand, since the ether oil such as polyalkylene glycol (PAG) has a large polarity, the ether oil can suppress the solubility of the hydrocarbon refrigerant therein to low level. But the ether oil has a disadvantage that an electrical insulating property, which is one of indispensable characteristics as the refrigerating machine oil, is low, and in addition, its essential lubricity derived from its structure is inferior to that of the ester oil.

The fluorinated oil is difficult to be compatible with the hydrocarbon refrigerant on the contrary, and there arises a problem of oil return in a refrigeration cycle. Besides, the fluorinated oil is extremely expensive, and it is not realistic to industrially use it.

In consideration of the aforementioned problems, an object of the present invention is to provide a refrigerating machine oil that has appropriate compatibility and solubility with a hydrocarbon refrigerant, can retain viscosity not impairing lubricity, and is excellent in the lubricity, the electrical insulating property and the stability, a method for manufacturing the same, and a working fluid composition for a refrigerating machine containing the refrigerating machine oil.

Solution to Problem

In order to achieve the object, the present inventors have made earnest examinations, resulting in finding that an ester having a very limited specific chemical structure, among various esters, and having a comparatively large polarity, what is called a complex ester, has proper compatibility and solubility with a hydrocarbon refrigerant, has satisfactory lubricity, high stability and low hygroscopicity, and is excellent as a refrigerating machine oil for a hydrocarbon refrigerant of propane, isobutane or the like, and thus, the present invention was accomplished.

Specifically, the present invention provides a working fluid composition for a refrigerating machine according to the following [1] to [9], a refrigerating machine oil according to the following [10] or [11], and a method for manufacturing a refrigerating machine oil according to the following [12].

[1] A working fluid composition for a refrigerating machine, comprising: a refrigerating machine oil comprising a complex ester as a base oil; and a hydrocarbon refrigerant having 2 to 4 carbon atoms, the complex ester being obtainable by further esterifying, with at least one selected from a monohydric alcohol having 1 to 20 carbon atoms and a fatty acid (a chain monocarboxylic acid) having 2 to 20 carbon atoms, an ester intermediate obtained by reacting a neopentyl polyol with a dibasic acid, and having an acid value of 0.5 mgKOH/g or less, the refrigerating machine oil having a kinematic viscosity at 100° C. of 2 to 50 mm$^2$/s.

[2] A working fluid composition for a refrigerating machine, comprising: a refrigerating machine oil comprising a complex ester as a base oil; and a hydrocarbon refrigerant having 2 to 4 carbon atoms, the complex ester being a complex ester of a neopentyl polyol, a dibasic acid, and at least one selected from a monohydric alcohol having 1 to 20 carbon atoms and a fatty acid having 2 to 20 carbon atoms, and having an acid value of 0.5 mgKOH/g or less, the refrigerating machine oil having a kinematic viscosity at 100° C. of 2 to 50 mm$^2$/s.

[3] The working fluid composition for a refrigerating machine according to [1] or [2], wherein the neopentyl polyol is at least one selected from neopentyl glycol, trimethylol propane and pentaerythritol, the dibasic acid is at least one selected from adipic acid, pimelic acid, suberic acid, azelaic acid and sebacic acid, and the hydrocarbon refrigerant is at least one selected from propane, butane and isobutane.

[4] The working fluid composition for a refrigerating machine according to any one of [1] to [3], wherein the monohydric alcohol is at least one selected from linear alcohol having 4 to 18 carbon atoms, 2-ethyl hexanol and 3,5,5-trimethyl hexanol.

[5] The working fluid composition for a refrigerating machine according to any one of [1] to [4], wherein the fatty acid is at least one selected from linear fatty acid having 5 to 18 carbon atoms, 2-ethyl hexanoic acid and 3,5,5-trimethyl hexanoic acid.

[6] The working fluid composition for a refrigerating machine according to any one of [1] to [5], wherein the complex ester is obtainable by further esterifying, with a monohydric alcohol having 1 to 20 carbon atoms, an ester intermediate obtained by reacting the dibasic acid with trimethylol propane at a ratio of 1.5 moles or more and less than 3 moles of the dibasic acid per 1 mole of trimethylol propane.

[7] The working fluid composition for a refrigerating machine according to any one of [1] to [6], further comprising at least one additive selected from a hindered phenol compound, an aromatic amine compound, an epoxy compound, a carbodiimide and a phosphoric acid ester, wherein a total content of the additive is 0.05 to 5.0% by mass based on a total amount of the refrigerating machine oil.

[8] The working fluid composition for a refrigerating machine according to any one of [1] to [7], wherein a volume resistivity at 80° C. of the refrigerating machine oil is $10^{11}$ Ω·cm or more.

[9] The working fluid composition for a refrigerating machine according to any one of [1] to [8], wherein the hydrocarbon refrigerant is propane.

[10] A refrigerating machine oil comprising a complex ester as a base oil, the complex ester being obtainable by further esterifying, with a monohydric alcohol having 1 to 20 carbon atoms or a fatty acid having 2 to 20 carbon atoms, an ester intermediate obtained by reacting a neopentyl polyol with a dibasic acid, and having an acid value of 0.5 mgKOH/g or less, the refrigerating machine oil having a kinematic viscosity at 100° C. of 2 to 50 mm$^2$/s, and being used with a hydrocarbon refrigerant having 2 to 4 carbon atoms.

[11] A refrigerating machine oil comprising a complex ester as a base oil, the complex ester being a complex ester of a neopentyl polyol, a dibasic acid and at least one selected from a monohydric alcohol having 1 to 20 carbon atoms and a fatty acid having 2 to 20 carbon atoms, and having an acid value of 0.5 mgKOH/g or less, the refrigerating machine oil having a kinematic viscosity at 100° C. of 2 to 50 mm$^2$/s, and being used with a hydrocarbon refrigerant having 2 to 4 carbon atoms.

[12] A method for manufacturing a refrigerating machine oil comprising: a first step of obtaining an ester intermediate by reacting a neopentyl polyol with a dibasic acid; a second step of obtaining a complex ester having an acid value of 0.5 mgKOH/g or less by esterifying the ester intermediate with at least one selected from a monohydric alcohol having 1 to 20 carbon atoms and a fatty acid having 2 to 20 carbon atoms; and a third step of preparing a refrigerating machine oil having a kinematic viscosity at 100° C. of 2 to 50 mm$^2$/s by using the complex ester as a base oil, the refrigerant machine oil being used with a hydrocarbon refrigerant having 2 to 4 carbon atoms.

Advantageous Effects of Invention

The present invention can provide a refrigerating machine oil that has appropriate compatibility and solubility with a hydrocarbon refrigerant, can retain viscosity not impairing lubricity, can reduce the filling amount of the refrigerant, and is excellent in the lubricity, the electrical insulating property and the stability, and also provide a method for manufacturing the same, and a working fluid composition for a refrigerating machine containing the refrigerating machine oil.

Incidentally, the present inventors presume the reason why the aforementioned effects can be exhibited by the present invention as follows. The refrigerating machine oil of the present invention is presumed to have an appropriately large polarity, dissolve properly a hydrocarbon refrigerant having 2 to 4 carbon atoms, and be able to retain a given level of viscosity also after dissolving the refrigerant therein. Besides, the refrigerating machine oil of the present invention is presumed to show high adsorption on the surface of a sliding portion in the presence of the hydrocarbon refrigerant having 2 to 4 carbon atoms, and hence can attain satisfactory lubricity in practical use.

DESCRIPTION OF EMBODIMENTS

Preferable embodiments of the present invention will now be described in detail.

Embodiment 1

Refrigerating Machine Oil and Method for Manufacturing the Same

A refrigerating machine oil according to Embodiment 1 of the present invention comprises a complex ester as a base oil, wherein the complex ester is obtainable by further esterifying, with a monohydric alcohol having 1 to 20 carbon atoms or a fatty acid having 2 to 20 carbon atoms, an ester intermediate obtained by reacting a neopentyl polyol with a dibasic acid, and has an acid value of 0.5 mgKOH/g or less, and wherein the refrigerating machine oil has a kinematic viscosity at 100° C. of 2 to 50 mm$^2$/s, and is used with a hydrocarbon refrigerant having 2 to 4 carbon atoms. Alternatively, as another aspect of the present embodiment, the refrigerating machine oil comprises a complex ester as a base oil, wherein the complex ester is a complex ester of a neopentyl polyol, a dibasic acid, and at least one selected from a monohydric alcohol having 1 to 20 carbon atoms and a fatty acid having 2 to 20 carbon atoms, has an acid value of 0.5 mgKOH/g or less, and has a kinematic viscosity at 100° C. of 2 to 50 mm$^2$/s, and wherein the refrigerating machine oil is used with a hydrocarbon refrigerant having 2 to 4 carbon atoms.

Examples of the neopentyl polyol used in the present embodiment include neopentyl glycol, trimethylol propane, pentaerythritol, dipentaerythritol, trimethylol ethane and trimethylol butane. Among these neopentyl polyol esters, a neopentyl polyol having 5 to 10 carbon atoms is preferred, and neopentyl glycol, trimethylol propane and pentaerythritol are particularly preferred. If the number of carbon atoms of the neopentyl polyol exceeds 10, the ratio of a hydrocarbon moiety occupying in a complex ester molecule is large, and hence, the solubility with the hydrocarbon refrigerant tends to be increased.

Examples of the dibasic acid used in the present embodiment include dicarboxylic acids, and in particular, a dibasic acid represented by the following formula (1):

$$\text{HOOC(CH}_2)_n\text{COOH} \quad (1)$$

wherein n represents an integer of 1 or more.

In formula (1), n represents an integer of 1 or more, preferably an integer of 2 to 10, and more preferably an integer of 4 to 8.

Preferable examples of the dibasic acid represented by formula (1) include adipic acid, pimelic acid, suberic acid, azelaic acid and sebacic acid, and among these, adipic acid, pimelic acid and suberic acid are particularly preferred. Such a dibasic acid has an appropriately large polarity, and is preferably used as a material for synthesizing the complex ester of the present embodiment.

The monohydric alcohol having 1 to 20 carbon atoms used in the present embodiment may be either linear or branched. Examples of a linear monohydric alcohol include methanol, ethanol, n-propanol, n-butanol, n-pentanol, n-hexanol, n-heptanol, n-octanol, n-nonanol, n-decanol, n-dodecanol and oleyl alcohol, and among these alcohols, a linear monohydric alcohol having 4 to 18 carbon atoms is preferred. Specific examples of a branched monohydric alcohol include all the structural isomers of the aforementioned linear monohydric alcohols, and among these, 2-ethyl hexanol and 3,5,5-trimethyl hexanol are preferred. A mixed alcohol of a linear monohydric alcohol and a branched monohydric alcohol also can be suitably used, and the numbers of types of the linear monohydric alcohol and the branched monohydric alcohol used in this case may be one, or two or more. Although an unsaturated monohydric alcohol may be used, a saturated monohydric alcohol is preferred.

The fatty acid having 2 to 20 carbon atoms used in the present embodiment may be either linear or branched. Examples of a linear fatty acid having 2 to 20 carbon atoms include acetic acid, n-propanoic acid, n-butanoic acid, n-pentanoic acid, n-hexanoic acid, n-heptanoic acid, n-octanoic acid, n-nonanoic acid, n-decanoic acid and oleic acid. A linear fatty acid having 5 to 18 carbon atoms is preferred, and a linear fatty acid having 8 to 12 carbon atoms is preferred. Examples of a branched fatty acid include all the structural isomers of the aforementioned linear acids. Among these, a branched fatty acid having 5 to 18 carbon atoms, and particularly 8 to 12 is preferred, and 2-ethyl hexanoic acid, 3,5,5-trimethyl hexanoic acid or a mixture thereof is further preferably used. A mixed fatty acid of a linear fatty acid and a branched fatty acid also may be preferably used, and the numbers of types of the linear fatty acid and the branched fatty acid used in this case may be one, or two or more. Although an unsaturated fatty acid may be used, a saturated fatty acid is preferred.

In both of the monohydric alcohol and the fatty acid, if the number of carbon atoms is small, the hydrolytic stability is lowered, and on the contrary, if the number of carbon atoms is too large, the affinity with the hydrocarbon refrigerant is increased to increase the solubility with it, resulting that such a compound is unsuitable for the object of the present invention. The number of carbon atoms of each of the monohydric alcohol and the fatty acid is preferably 3 to 12, and particularly preferably 4 to 10.

The complex ester of the present embodiment can be obtained by esterification through a dehydration reaction of the specific neopentyl polyol and dibasic acid, and further with the specific monohydric alcohol or fatty acid, by general esterification via a derivative, such as an acid anhydride or an acid chloride, of a fatty acid, or by transesterification of respective derivatives.

Specifically, a method for manufacturing a refrigerating machine oil of the present embodiment comprises: a first step of obtaining an ester intermediate by reacting a neopentyl polyol and a dibasic acid; a second step of obtaining a complex ester having an acid value of 0.5 mgKOH/g or less by esterifying the ester intermediate with at least one selected from a monohydric alcohol having 1 to 20 carbon atoms and a fatty acid having 2 to 20 carbon atoms; and a third step of preparing a refrigerating machine oil having a kinematic viscosity at 100° C. of 2 to 50 mm$^2$/s by using the complex ester as a base oil.

In the present embodiment, the complex ester of interest is obtained through the two steps of the esterification as described above. More specifically, through the reaction of the neopentyl polyol and the dibasic acid performed in the first step, an intermediate in which a carboxyl group or a hydroxyl group remains depending upon a molar ratio therebetween can be arbitrarily obtained. Then, the intermediate is further esterified with a monohydric alcohol having 1 to 20 carbon atoms, particularly 4 to 10 carbon atoms, if a carboxyl group (—COOH) remains in the intermediate, or further esterified with a fatty acid having 2 to 20 carbon atoms, particularly 4 to 10 carbon atoms, if a hydroxyl group remains, so as to adjust the acid value to 0.5 mgKOH/g or less. In this manner, the obtained complex ester can be provided with an appropriately large polarity and adsorption on the surface of a sliding portion. Therefore, the complex ester has appropriate compatibility and solubility with the hydrocarbon refrigerant, and can retain viscosity not impairing lubricity, and the filling amount of the refrigerant can be reduced. Besides, the refrigerating machine oil of the present embodiment is excellent also in the lubricity, the electrical insulating property and the stability.

In the first step, a quantitative ratio among the neopentyl polyol, the dibasic acid, and the monohydric alcohol having 1 to 20 carbon atoms or the fatty acid having 2 to 20 carbon atoms can be appropriately selected in accordance with the types and a combination of these materials.

For example, if the neopentyl polyol is trimethylol propane, it is preferable to further esterify, with a monohydric alcohol, an ester intermediate obtained by reacting the dibasic acid with trimethylol propane at a ratio of 1.5 moles or more and less than 3 moles, and particularly 1.7 moles or more and less than 2.5 moles, of the dibasic acid per 1 mole of trimethylol propane. Alternatively, it is preferable to further esterify, with a fatty acid, an ester intermediate obtained by reacting dibasic acid with trimethylol propane at a ratio of 0.6 mole or more and less than 1.5 moles, and particularly 0.8 mole or more and less than 1.5 moles, of the dibasic acid per 1 mole of trimethylol propane.

If the neopentyl polyol is neopentyl glycol, it is preferable to further esterify, with a monohydric alcohol, an ester intermediate obtained by reacting the dibasic acid with neopentyl glycol at a ratio of 1.0 mole or more and less than 2.0 moles, and particularly 1.2 moles or more and less than 1.7 moles, of the dibasic acid per 1 mole of neopentyl glycol. Alternatively, it is preferable to further esterify, with a fatty acid, an ester intermediate obtained by reacting dibasic acid with neopentyl glycol at a ratio of 0.6 mole or more and less than 1.2 moles, and particularly 0.7 mole or more and less than 1.0 mole, of the dibasic acid per 1 mole of neopentyl glycol.

The complex ester obtained by the aforementioned manufacturing method may have a carboxyl group and/or a hydroxyl group remaining unreacted, but it is preferable that a carboxyl group does not remain. If the amount of remaining carboxyl groups is large, it is apprehended that an unpreferable phenomenon, such as precipitation of a metal soap and the like generated through a reaction with a metal used inside the refrigerating machine, may occur. From this point of view, the acid value of the complex ester of the present embodiment is 0.5 mgKOH/g or less. A preferable acid value is 0.1 mgKOH/g or less. An acid value herein means an acid value measured in accordance with JIS K2501.

If the amount of remaining hydroxyl groups is too large, an unpreferable phenomenon that the ester becomes clouded at a low temperature and blocks a capillary device in a refrigeration system occurs, and therefore, the hydroxyl value of the complex ester of the present embodiment is preferably 100 mgKOH/g or less, more preferably 60 mgKOH/g or less, and further more preferably 30 mgKOH/g or less. A hydroxyl value herein means a hydroxyl value measured in accordance with JIS K0070. The acid value and the hydroxyl value of the refrigerating machine oil of the present embodiment can be the same as those of the complex ester.

The kinematic viscosity at 100° C. of the refrigerating machine oil of the present embodiment is 2 to 50 mm$^2$/s, and preferably 5 to 40 mm$^2$/s. If the kinematic viscosity at 100° C. falls in the above range, the refrigerating machine can be properly operated, and high efficiency can be assured. Furthermore, if the kinematic viscosity at 100° C. is 10 to 30 mm$^2$/s, reliability in wear resistance of a compressor can be further improved. Incidentally, a kinematic viscosity herein means a kinematic viscosity measured in accordance with JIS K2283.

The pour point of the refrigerating machine oil of the present embodiment is preferably −15° C. or less, and more preferably −25° C. or less from the viewpoint of a low temperature characteristic necessary as the refrigerating machine oil. A pour point herein means a pour point measured in accordance with JIS K2269. The kinematic viscosity and the pour point of the complex ester of the present embodiment can be the same as those of the refrigerating machine oil.

Since the refrigerating machine oil of the present embodiment contains the above-described complex ester as a base oil, the refrigerating machine oil of the present embodiment shows appropriate compatibility and solubility over a wide range from a low temperature to a high temperature when used as a refrigerating machine oil with a hydrocarbon refrigerant such as propane (R290), and thus the lubricity and thermal stability can be greatly improved. Besides, as compared with polyalkylene glycol (PAG) or the like used as a refrigerating machine oil for a HFC (hydrofluorocarbon) refrigerant, the refrigerating machine oil of the present embodiment has much higher electrical insulating property and small hygroscopicity.

The refrigerating machine oil of the present embodiment may consist of the above-described complex ester (namely, the content of the complex ester may be 100% by mass), but it can further contain a base oil other than the complex ester and an additive as long as the function as the refrigerating machine oil is satisfied. In this case, the content of the complex ester is preferably 60% by mass or more, more preferably 80% by mass or more, and further more preferably 95% by mass or more, based on the total amount of the refrigerating machine oil.

Examples of another base oil that may be contained in the refrigerating machine oil of the present embodiment include an ester other than the complex ester, an ether such as polyalkylene glycol (PAG) or polyvinyl ether (PVE), and alkyl benzene or a mineral oil as hydrocarbon base.

Furthermore, the refrigerating machine oil of the present embodiment may further contain a stability improving additive for further improving the stability of a mixed fluid of the refrigerant and the refrigerating machine oil in actual use. Preferable examples of the additive for improving stability include one or more of a hindered phenol compound, an aromatic amine compound, an epoxy compound and a carbodiimide, and it is more preferable to use an epoxy compound and a carbodiimide together. The refrigerating machine oil of the present embodiment may further contain an anti-wear agent such as phosphoric acid ester. The contents of the stability improving additive and the anti-wear additive are, in terms of the sum of them, preferably 0.05 to 5.0% by mass based on the total amount of the refrigerating machine oil.

Among the stability improving additives, preferable examples of the hindered phenol compound include 2,6-di-tert.-butyl phenol, 2,6-di-tert.-butyl-p-cresol and 4,4-methylene-bis-(2,6-di-tert.-butyl-p-cresol). The content of the hindered phenol compound is preferably 0.05 to 1.0% by mass, and more preferably 0.1 to 0.5% by mass based on the total amount of the refrigerating machine oil.

Examples of the aromatic amine compound include α-naphthylamine and p,p'-di-octyl-diphenylamine(di(4-octylphenyl)amine), and a di(alkylphenyl)amine having an alkyl group having 4 to 12 carbon atoms is preferred. The content of the aromatic amine compound is preferably 0.05 to 1.0% by mass, and more preferably 0.1 to 0.5% by mass based on the total amount of the refrigerating machine oil.

Examples of the epoxy compound include a glycidyl ether group-containing compound, an epoxidized fatty acid monoester, an epoxidized fat or oil, and an epoxy cycloalkyl group-containing compound, and an alkyl glycidyl ether having an alkyl group having 6 to 12 carbon atoms is preferred. The content of the epoxy compound is preferably 0.1 to 2.0% by mass, and more preferably 0.2 to 1.0% by mass based on the total amount of the refrigerating machine oil.

Preferable examples of the phosphoric acid ester include triaryl phosphates such as triphenyl phosphate or tricresyl phosphate. The content of the phosphoric acid ester is preferably 0.2 to 5.0% by mass, and more preferably 0.5 to 2.0% by mass based on the total amount of the refrigerating machine oil.

An example of a preferable combination of the above-described additives includes a combination of an aromatic amine compound, an epoxy compound and a phosphoric acid ester. Furthermore, a combination of a di(alkylphenyl) amine having an alkyl group having 4 to 12 carbon atoms, an alkyl glycidyl ether having an alkyl group having 6 to 12 carbon atoms and triaryl phosphate is particularly preferred.

Moreover, additives such as an anti-wear agent like an organic sulfur compound, an oiliness agent like an alcohol or a higher fatty acid, a metal deactivator like a benzotriazole derivative, and an antifoaming agent like silicone oil may be appropriately added to the refrigerating machine oil of the present embodiment. The total content of these additives is preferably 0.0005 to 3.0% by mass based on the total amount of the refrigerating machine oil.

The refrigerating machine oil of the present embodiment can be preferably used as a lubricating oil for a refrigerating machine in which a hydrocarbon refrigerant having 2 to 4 carbon atoms is used. Here, if the refrigerating machine oil of the present embodiment is applied to a room air conditioner or the like in which propane (R290) is used as a refrigerant, it is preferable that the refrigerating machine oil have a characteristic suitable to a motorized (hermetic) compressor, namely, a high electrical insulating property. More specifically, the volume resistivity at 80° C. of the refrigerating machine oil of the present invention is preferably $10^9$ Ω·m or more (namely, $10^{-3}$ TΩ·m or more). A volume resistivity herein means a value measured in accordance with JIS C2101. If an additive is used, the volume resistivity means a volume resistivity of the refrigerating machine oil after adding the additive.

Embodiment 2

Working Fluid Composition for Refrigerating Machine

A working fluid composition for a refrigerating machine according to Embodiment 2 of the present invention comprises: a refrigerating machine oil comprising a complex ester as a base oil; and a hydrocarbon refrigerant having 2 to 4 carbon atoms, wherein the complex ester is obtainable by further esterifying, with at least one selected from a monohydric alcohol having 1 to 20 carbon atoms and a fatty acid (a chain monocarboxylic acid) having 2 to 20 carbon atoms, an ester intermediate obtained by reacting a neopentyl polyol with a dibasic acid, and has an acid value of 0.5 mgKOH/g or less, and wherein the refrigerating machine oil has a kinematic viscosity at 100° C. of 2 to 50 mm²/s. In another aspect of the working fluid composition for a refrigerating machine of the present embodiment, the working fluid composition for a refrigerating machine comprises a refrigerating machine oil comprising a complex ester as a base oil; and a hydrocarbon refrigerant having 2 to 4 carbon atoms, wherein the complex ester is a complex ester of a neopentyl polyol, a dibasic acid and at least one selected from a monohydric alcohol having 1 to 20 carbon atoms and a fatty acid having 2 to 20 carbon atoms, and has an acid value of 0.5 mgKOH/g or less and a kinematic viscosity at 100° C. of 2 to 50 mm²/s. The refrigerating machine oil contained in the working fluid composition for a refrigerating machine of the present embodiment is the same as the refrigerating machine oil according to Embodiment 1 described above, and hence redundant description will be herein omitted.

As the hydrocarbon refrigerant having 2 to 4 carbon atoms of the present embodiment, ethane, propane, n-butane or i-butane is specifically used, among which propane (R290) is preferable.

In the working fluid composition for a refrigerating machine of the present embodiment, a content ratio between the refrigerant and the refrigerating machine oil is not especially limited, but a refrigerant/refrigerating machine oil ratio is preferably 10/90 to 90/10, and more preferably 30/70 to 70:30.

EXAMPLES

The present invention will now be more specifically described by way of examples and comparative examples, but it is noted that the present invention is not limited to the following examples at all.

Example 1

Manufacturing of Complex Ester A

With 104 g (1.0 mole) of neopentyl glycol (NPG), 219 g (1.5 moles) of adipic acid (AA) was reacted at 220° C. for 3 hours to obtain an ester intermediate. To this ester intermediate, 156 g (1.2 moles) of 2-ethyl hexanol was added to cause a reaction at 220° C. for 2 hours, so as to esterify a carboxyl group remaining in the ester intermediate. After completing the reaction, 2-ethyl hexanol remaining in the resultant reaction mixture was removed, and a trace amount of impurities was further removed by an adsorption treatment (a clay treatment), resulting in obtaining a complex ester of interest (namely, a complex ester of neopentyl glycol, adipic acid and 2-ethyl hexanol, hereinafter referred to as the "complex ester A").

Example 2

Manufacturing of Complex Ester B

With 208 g (2.0 moles) of neopentyl glycol (NPG), 219 g (1.5 moles) of adipic acid (AA) was reacted at 230° C. for 4 hours to obtain an ester intermediate. To this ester intermediate, 190 g (1.2 moles) of 3,5,5-trimethyl hexanoic acid was added to cause a reaction at 230° C. for 2 hours, so as to esterify a hydroxyl group remaining in the ester intermediate. After completing the reaction, 3,5,5-trimethyl hexanoic acid remaining in the resultant reaction mixture was removed, and a trace amount of impurities was further removed by the adsorption treatment (the clay treatment), resulting in obtaining a complex ester of interest (namely, a complex ester of neopentyl glycol, adipic acid and 3,5,5-trimethyl hexanoic acid, hereinafter referred to as the "complex ester B").

Example 3

Manufacturing of Complex Ester C

With 134 g (1.0 mole) of trimethylol propane (TMP), 348 g (2.0 moles) of suberic acid (SA) was reacted at 220° C. for 3 hours to obtain an ester intermediate. To this ester intermediate, 89 g (1.2 moles) of tert.-butanol was added to cause a reaction at 220° C. for 2 hours, so as to esterify a carboxyl group remaining in the ester intermediate. After completing the reaction, tert.-butanol remaining in the resultant reaction mixture was removed, and a trace amount of impurities was further removed by the adsorption treatment (the clay treatment), resulting in obtaining a complex ester of interest (namely, a complex ester of trimethylol propane, suberic acid and tert.-butanol, hereinafter referred to as the "complex ester C").

Example 4

Manufacturing of Complex Ester D

With 201 g (1.5 moles) of trimethylol propane (TMP), 292 g (2.0 moles) of adipic acid (AA) was reacted at 235° C. for 4 hours to obtain an ester intermediate. To this ester intermediate, 103 g (0.6 mole) of n-decanoic acid was added to cause a reaction at 230° C. for 3 hours, so as to esterify a hydroxyl group remaining in the ester intermediate. After completing the reaction, n-decanoic acid remaining in the resultant reaction mixture was removed, and a trace amount of impurities was further removed by the adsorption treatment (the clay treatment), resulting in obtaining a complex ester of interest (namely, a complex ester of trimethylol propane, adipic acid and n-decanoic acid, hereinafter referred to as the "complex ester D").

Examples 5 to 12 and Comparative Examples 1 to 5

Preparation and Evaluation of Refrigerating Machine Oil

In Examples 5 to 12 and Comparative Examples 1 to 5, refrigerating machine oils having compositions shown in Tables 1 to 3 were prepared by using the following base oils and additives. The kinematic viscosity at 100° C., the acid value and the pour point of each of the obtained refrigerating machine oils are also shown in Tables 1 to 3.

(Base Oil)
Base oil 1: Complex ester A
Base oil 2: Complex ester B
Base oil 3: Complex ester C
Base oil 4: Complex ester D
Base oil 5: Ester of pentaerythritol (PE) and 3,5,5-trimethyl hexanoic acid
Base oil 6: Ester of neopentyl glycol (NPG) and 2-ethyl hexanoic acid
Base oil 7: Ester of trimethylol propane (TMP) and oleic acid
Base oil 8: Polyalkylene glycol (PAG; having a butyl group and a hydroxyl group at the ends thereof, having an oxypropylene skeleton, and having an average molecular weight of 1200)
Base oil 9: Paraffin mineral oil (manufactured by DC Nippon Oil & Energy Corporation)

Incidentally, also the base oils 5 to 7 were subjected to the adsorption treatment at the final stage of the manufacturing for removing a trace amount of impurities.

(Additive)
Hindered phenol compound: Di-tert.-butyl-p-cresol (DBPC)
Aromatic amine compound: Dioctyldiphenylamine (DODA)
Epoxy compound: 2-Ethylhexyl glycidyl ether (2-EDGE)
Carbodiimide: Diphenyl carbodiimide (DPCI)
Phosphoric acid ester: Tricresyl phosphate (TCP)

TABLE 1

| Item | | Example 5 | Example 6 | Example 7 | Example 8 |
|---|---|---|---|---|---|
| Base oil | Type | Base oil 1 | Base oil 2 | Base oil 3 | Base oil 4 |
| | Content | Balance | Balance | Balance | Balance |
| Additive | DBPC, mass % | — | — | — | — |
| | DODA, mass % | — | — | — | — |
| | 2-EHGE, mass % | — | — | — | — |
| | DPCI, mass % | — | — | — | — |
| | TCP, mass % | — | — | — | — |
| Kinematic viscosity at 100° C., mm²/s | | 9.8 | 20.2 | 11.0 | 27.4 |
| Acid value, mgKOH/g | | 0.01 | 0.03 | 0.01 | 0.03 |
| Pour point, ° C. | | −35.0 | −30.0 | −30.0 | −32.5 |

TABLE 2

| Item | | Example 9 | Example 10 | Example 11 | Example 12 |
|---|---|---|---|---|---|
| Base oil | Type | Base oil 1 | Base oil 2 | Base oil 3 | Base oil 4 |
| | Content | Balance | Balance | Balance | Balance |
| Additive | DBPC, mass % | 0.2 | 0.2 | — | — |
| | DODA, mass % | — | — | 0.2 | 0.2 |
| | 2-EHGE, mass % | — | 0.5 | 0.5 | 0.5 |
| | DPCI, mass % | — | — | — | 0.1 |
| | TCP, mass % | — | — | 1.0 | 1.0 |
| Kinematic viscosity at 100° C., mm²/s | | 9.8 | 20.0 | 10.8 | 27.1 |
| Acid value, mgKOH/g | | 0.01 | 0.03 | 0.01 | 0.03 |
| Pour point, ° C. | | −35.0 | −30.0 | −30.0 | −32.5 |

TABLE 3

| Item | | Comparative Example 1 | Comparative Example 2 | Comparative Example 3 | Comparative Example 4 | Comparative Example 5 |
|---|---|---|---|---|---|---|
| Base oil | Type | Base oil 5 | Base oil 6 | Base oil 7 | Base oil 8 | Base oil 9 |
|  | Content | Balance | Balance | Balance | Balance | Balance |
| Additive | DBPC, mass % | — | 0.2 | — | 0.2 | — |
|  | DODA, mass % | — | — | 0.2 | — | — |
|  | 2-EHGE, mass % | — | 0.5 | 0.5 | — | — |
|  | DPCI, mass % | — | — | 0.1 | — | — |
|  | TCP, mass % | — | — | 1.0 | — | — |
| Kinematic viscosity at 100° C., mm$^2$/s | | 10.8 | 2.4 | 9.2 | 11.2 | 9.2 |
| Acid value, mgKOH/g | | 0.01 | 0.01 | 0.03 | 0.01 | 0.01 |
| Pour point, ° C. | | −22.5 | −50.0 | −30.0 | −42.5 | −15.0 |

Next, the following evaluation tests were performed on the refrigerating machine oils of Examples 5 to 12 and Comparative Examples 1 to 5.

[Refrigerant Solubility]

Fifteen grams of each refrigerating machine oil was placed in a glass pressure vessel, the vessel was charged with a refrigerant R290 (propane), and with the temperature set to each of several points between room temperature and 60° C., a temperature/pressure/solubility curve was created by calculation on the basis of the volume of the refrigerating machine oil in which the propane was dissolved and the pressure applied at that time. On the basis of the thus obtained temperature/pressure/solubility curve, the amount of the propane dissolved in each sample oil at 60° C. and 1.0 MPa (dissolved propane/sample oil+dissolved propane: % by mass) was obtained. The obtained results are shown in Tables 4 to 6.

[Thermal Stability]

In accordance with ANSI/ASHRAE 97-1983, a stainless steel cylinder (with an internal volume of 100 ml) was charged with 20 g of each refrigerating machine oil, 20 g of the refrigerant 8290 (propane) and a catalyst (a wire of iron, copper or aluminum), the resulting cylinder was heated to 175° C., and after retaining the resultant for 14 days, a color tone (according to ASTM) and an acid value of the refrigerating machine oil were measured. The obtained results are shown in Tables 4 to 6.

[Lubricity]

In accordance with ASTM D-3233-73, a Falex burning load was measured under an atmosphere where the blowing of the refrigerant R290 (propane) was controlled (to a blowing rate of 70 ml/min). The obtained results are shown in Tables 4 to 6.

[Electrical Insulating Property]

In accordance with JIS C2101, the volume resistivity at 80° C. of each refrigerating machine oil was measured. The obtained results are shown in Tables 4 to 6.

TABLE 4

| | Item | Example 5 | Example 6 | Example 7 | Example 8 |
|---|---|---|---|---|---|
| Solubility | Amount of dissolved refrigerant (propane) (60° C., 1.0 MPa), mass % | 27 | 23 | 26 | 20 |
| Thermal stability | Color tone (ASTM, 175° C., after 14 days) | L1.0 | L1.0 | L1.0 | L1.0 |
|  | Acid value (ASTM, 175° C., after 14 days), mgKOH/g | 0.01 | 0.03 | 0.01 | 0.03 |
| Lubricity | Falex burning load, N | 4100 | 4180 | 4120 | 4280 |
| Electrical insulating property | Volume resistivity (80° C.), TΩ · m | 0.7 | 0.8 | 0.6 | 0.8 |

TABLE 5

| | Item | Example 9 | Example 10 | Example 11 | Example 12 |
|---|---|---|---|---|---|
| Solubility | Amount of dissolved refrigerant (propane) (60° C. 1.0 MPa), mass % | 27 | 23 | 26 | 20 |
| Thermal stability | Color tone (ASTM, 175° C., after 14 days) | L1.0 | L1.0 | L1.0 | L1.0 |
|  | Acid value (ASTM, 175° C., after 14 days), mgKOH/g | 0.01 | 0.03 | 0.01 | 0.03 |
| Lubricity | Falex burning load, N | 4100 | 4200 | 4800 | 4860 |
| Electrical insulating property | Volume resistivity (80° C.), TΩ · m | 0.7 | 0.7 | 0.6 | 0.8 |

TABLE 6

| Item | | Comparative Example 1 | Comparative Example 2 | Comparative Example 3 | Comparative Example 4 | Comparative Example 5 |
|---|---|---|---|---|---|---|
| Solubility | Amount of dissolved refrigerant (propane) (60° C., 1.0 MPa), mass % | 38 | 51 | 40 | 18 | 71 |
| Thermal stability | Color tone (ASTM, 175° C., after 14 days) | L1.0 | L1.0 | L1.0 | L1.0 | L1.0 |
| | Acid value (ASTM, 175° C., after 14 days), mgKOH/g | 0.01 | 0.01 | 0.01 | 0.01 | 0.01 |
| Lubricity | Falex burning load, N | 3260 | 3100 | 3520 | 2800 | 1000 or less |
| Electrical insulating property | Volume resistivity (80° C.), TΩ·m | 1.3 | 0.8 | 1.0 | 0.001 | 2.2 |

It is understood, as shown in Tables 1 to 6, that the refrigerating machine oil of each of Examples 5 to 12 containing the complex ester of any of Examples 1 to 4 is appropriately dissolved with the hydrocarbon refrigerant, and has good characteristics as a refrigerating machine oil including lubricity, a low-temperature characteristic, thermal stability and an electrical insulating property. On the other hand, with respect to the refrigerating machine oils of Comparative Examples 1 to 3, it is understood that the amount of hydrocarbon refrigerant dissolved therein is large and that these refrigerating machine oils are inferior in the lubricity. Besides, it is understood that although the amount of hydrogen refrigerant dissolved in the refrigerating machine oil of Comparative Example 4 is small, this refrigerating machine oil is greatly poor in the electrical insulating property indicated by the volume resistivity at 80° C. and is also inferior in the lubricity. Furthermore, it is understood that the refrigerating machine oil of Comparative Example 5 has no polarity and hence solubility of the hydrocarbon refrigerant is large and that this refrigerating machine oil is inferior also in the lubricity.

INDUSTRIAL APPLICABILITY

The working fluid composition for a refrigerating machine and the refrigerating machine oil of the present invention can be suitably used as a working fluid composition and a lubricating oil for a refrigerating machine using a hydrocarbon refrigerant of propane or the like. In particular, they can be used in a refrigeration system with high cooling efficiency, in which a compressor, a condenser, a throttle device (a refrigerant flow control unit such as an expansion valve or a capillary tube), an evaporator and the like are provided and a refrigerant is circulated among these components, particularly as a lubricating oil in a refrigerating machine including a rotary type, a swing type or a scroll type compressor, and can be suitably used in a room air conditioner, a package air conditioner, an industrial refrigerating machine and the like.

The invention claimed is:

1. A working fluid composition for a refrigerating machine, comprising:
    a refrigerating machine oil comprising a complex ester as a base oil; and
    a refrigerant consisting of at least one hydrocarbon refrigerant having 2 to 4 carbon atoms, wherein
    the complex ester is a complex ester of neopentyl polyol, a dibasic acid, and a monohydric alcohol having 1 to 20 carbon atoms,
    the complex ester has an acid value of 0.5 mgKOH/g or less, and
    the refrigerating machine oil has a kinematic viscosity at 100° C. of 2 to 50 mm$^2$/s.

2. The working fluid composition for a refrigerating machine according to claim 1, wherein
    the neopentyl polyol is at least one selected from neopentyl glycol, trimethylol propane, and pentaerythritol,
    the dibasic acid is at least one selected from adipic acid, pimelic acid, suberic acid, azelaic acid, and sebacic acid, and
    the refrigerant is at least one selected from propane, butane, and isobutane.

3. The working fluid composition for a refrigerating machine according to claim 1, wherein the monohydric alcohol is at least one selected from linear alcohols having 4 to 18 carbon atoms, 2-ethyl hexanol, and 3,5,5,-trimethyl hexanol.

4. The working fluid composition for a refrigerating machine according to claim 1, wherein the complex ester is obtained by further esterifying, with the monohydric alcohol having 1 to 20 carbon atoms, an ester intermediate obtained by reacting the dibasic acid with trimethylol propane at a ratio of 1.5 moles or more and less than 3 moles of the dibasic acid per 1 mole of trimethylol propane.

5. The working fluid composition for a refrigerating machine according to claim 1, further comprising at least one additive selected from a hindered phenol compound, an aromatic amine compound, an epoxy compound, a carbodiimide, and a phosphoric acid ester,
    wherein the total content of the additive is 0.05 to 5.0% by mass based on the total amount of the refrigerating machine oil.

6. The working fluid composition for a refrigerating machine according to claim 1, wherein the volume resistivity at 80° C. of the refrigerating machine oil is $10^{11}$ Ω·cm or more.

7. The working fluid composition for a refrigerating machine according to claim 1, wherein the refrigerant is propane.

8. A working fluid composition for a refrigerating machine, comprising:

a refrigerating machine oil comprising a complex ester as a base oil; and a refrigerant consisting of at least one hydrocarbon refrigerant having 2 to 4 carbon atoms, wherein the complex ester is obtained by further esterifying, with a monohydric alcohol having 1 to 20 carbon atoms, an ester intermediate obtained by reacting a neopentyl polyol with a dibasic acid, the complex ester has an acid value of 0.5 mgKOH/g or less, and the refrigerating machine oil has a kinematic viscosity at 100° C. of 2 to 50 mm$^2$/s.

* * * * *